(12) United States Patent
Raslambekov

(10) Patent No.: US 11,213,373 B1
(45) Date of Patent: Jan. 4, 2022

(54) METHODS AND SYSTEMS FOR MODELING MANDIBULAR MOTION

(71) Applicant: Oxilio Ltd, Larnaca (CY)

(72) Inventor: Islam Khasanovich Raslambekov, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

(21) Appl. No.: 17/320,666

(22) Filed: May 14, 2021

(51) Int. Cl.
*A61C 11/02* (2006.01)
*A61C 7/00* (2006.01)

(52) U.S. Cl.
CPC .......... *A61C 11/025* (2013.01); *A61C 7/002* (2013.01)

(58) Field of Classification Search
CPC .............................. A61C 11/025; A61C 7/002
USPC ............................................................ 433/54
See application file for complete search history.

(56) References Cited

U.S. PATENT DOCUMENTS

| | | | | |
|---|---|---|---|---|
| 7,824,346 B2 * | 11/2010 | Marshall | ................ | G16H 50/50 600/590 |
| 9,922,454 B2 * | 3/2018 | Jaisson | ................... | A61C 7/002 |
| 10,265,149 B2 * | 4/2019 | Jaisson | ................ | A61B 5/0077 |
| 10,529,073 B2 | 1/2020 | Alvarez et al. | | |
| 10,631,954 B1 * | 4/2020 | Raslambekov | ........ | A61C 7/002 |
| 10,695,146 B1 * | 6/2020 | Raslambekov | ......... | G06T 19/00 |
| 10,751,152 B2 | 8/2020 | Cheng et al. | | |
| 10,945,811 B1 * | 3/2021 | Raslambekov | ......... | G06T 19/00 |
| 10,952,817 B1 * | 3/2021 | Raslambekov | ........ | A61C 7/002 |

| | | | | |
|---|---|---|---|---|
| 2004/0209220 A1 * | 10/2004 | Manemann | ............ | G16H 20/40 433/24 |
| 2006/0095242 A1 * | 5/2006 | Marshall | ................ | G16H 50/50 703/11 |
| 2007/0207441 A1 | 9/2007 | Lauren | | |

(Continued)

FOREIGN PATENT DOCUMENTS

WO 2020104760 A2 5/2020

OTHER PUBLICATIONS

Tian et al. "Three-dimensional mandibular motion trajectory-tracking system based on BP neural network", Aug. 28, 2020 (Aug. 28, 2020), Mathematical Biosciences and Engineering, 2020, vol. 17, Issue 5: 5709-5726. DOI: 10.3934/mbe.2020307.

(Continued)

*Primary Examiner* — Matthew M Nelson
(74) *Attorney, Agent, or Firm* — BCF LLP

(57) ABSTRACT

A method for modeling mandibular motion, executable by an electronic device and including: acquiring a point cloud representing a mandible; determining an initial condyle pose; determining natural movement parameters for the condyles including maximum protrusion displacement, a Bennett angle, and a Sagittal inclination path angle; receiving an indication of a translation and/or a rotation of the mandible; determining a first natural movement of translation including a protrusion followed by a first sagittal inclination; determining a second natural movement of rotation including a Bennet movement followed by a second sagittal inclination; applying the natural movement s to the point cloud to form a transformed point cloud; creating a model of the mandible having undergone the at least one of the translation and the rotation using the transformed point cloud; and displaying the model of the mandible having undergone the translation and/or rotation.

15 Claims, 10 Drawing Sheets

(56) References Cited

U.S. PATENT DOCUMENTS

| | | | |
|---|---|---|---|
| 2008/0176182 A1* | 7/2008 | Hultgren | A61C 9/0046 |
| | | | 433/69 |
| 2013/0066598 A1* | 3/2013 | Fisker | A61C 19/05 |
| | | | 703/1 |
| 2013/0204600 A1* | 8/2013 | Mehra | G16H 50/50 |
| | | | 703/11 |
| 2014/0242539 A1* | 8/2014 | Fisker | G06F 30/00 |
| | | | 433/54 |
| 2018/0110603 A1* | 4/2018 | Stipek, Sr. | A61C 11/08 |
| 2019/0216580 A1* | 7/2019 | Fisker | A61C 11/00 |
| 2019/0290408 A1* | 9/2019 | Fisker | A61C 19/05 |
| 2020/0197137 A1 | 6/2020 | Xia et al. | |
| 2020/0268495 A1 | 8/2020 | Ryakhovsky et al. | |
| 2020/0383752 A1* | 12/2020 | Willers | G06N 3/08 |

OTHER PUBLICATIONS

English Machine Translation of WO2020104760 retrieved on May 28, 2020.

Solaberrieia et al. "Registration of mandibular movement for dental diagnosis, planning and treatment", published Dec. 4, 2017. Abstract retrieved on Jan. 7, 2021 from https://link.springer.com/article/10.1007/s12008-017-0438-4.

Furtado et al. "A specialized motion capture system for real-time analysis of mandibular movements using infrared cameras". Biomedical Engineering Online 12:17. (2013), Abstract retrieved on Jan. 7, 2021 from https://dialog.proquest.com/professionaldocview/1347681742/1763DC9225F65C8CB41/14?accountid=157282.

* cited by examiner

METHODS AND SYSTEMS FOR MODELING MANDIBULAR MOTION

The present technology relates to methods and systems for modeling mandibular motion for a subject, in general; and more specifically, for determining natural mandibular (jaw) motion for an orthodontic treatment for the subject.

BACKGROUND

In orthodontics, planning an orthodontic treatment for a subject includes determination of various factors. In some cases, this may include determining movement and different placement of the lower jaw (mandible) with respect to the upper jaw (maxilla).

However, there are certain contrasting requirements related to the orthodontic treatment: (1) efficiency requirement—minimizing an overall duration of the orthodontic treatment, and (2) safety requirement—ensuring that the planned orthodontic treatment does not cause damage to the subject's teeth or other buccal anatomical structures through collisions.

In some orthodontic treatment planning, orthodontic planning software, in conjunction with a dental professional, determines one or more intermediate steps of adjustment to tooth and jaw placement between a beginning state of the subject and a desired final tooth alignment. To balance both the efficiency and safety requirements, at least one goal of the orthodontic planning is to determine a minimum number of steps between the original and the desired orthodontic alignment, while not causing undue discomfort for the subject and not exceeding a maximum force on teeth for safety. In some cases, modeling of jaw movement could be used at different intermediate positions to analyze the treatment steps. This could include, for example, inspecting jaw movement and contact positions between the maxillary arch form and the mandibular arch form. In some cases, modeling of jaw movement could be used to determine possible impact on tooth contact or jaw position at intermediate positions to aid in preventing conditions that could affect the jaw (such as temporomandibular joint disorders).

Certain prior art approaches have been proposed to address the technical problem of modeling jaw movement for orthodontal treatment planning considering at least some of the above-identified requirements.

United States Patent Publication No.: 2020/0383752, published on Dec. 10, 2020, assigned to Dentsply Sirona Inc., and entitled "Method, System and Computer Readable Storage Media for Determining Articulation Parameters" discloses systems and methods for determining articulation parameters for a given patient, to be used in a virtual articulator by a dental professional to use for determining a treatment procedure. A plurality of mandible and mouth parameters are determined in order to populate a virtual articulator.

U.S. Pat. No. 10,529,073, issued on Jan. 7, 2020, assigned to 3M Innovative Properties Co., and entitled "Virtual Model of Articulation from Intra-Oral Scans" discloses a method for presenting a virtual articulation determined based on dental scans, to be used for diagnostic or restoration purposes. Based on a variety of poses of the maxillary and mandibular arches, pure rotation axes are determined for the relative movement of the mandibular arch to the maxillary arch.

SUMMARY

It is an object of the present technology to ameliorate at least some of the inconveniences present in the prior art.

The developers of the present technology have devised a method for modeling movement or motion of the mandible (lower jaw) and the mandibular arch form of a subject, using a point cloud representation of the mandible and mandibular arch, as well as the maxillary arch form in some cases. By translating a desired cartesian translation and/or rotation displacement of the mandible into the natural movements, the present technology provides a mandible model displaying movement information more closely portraying anatomically natural movements. In at least some cases, such movement information could be more accurate than use of purely cartesian movements of such a model. In such a case, the present technology could aid in determining more accurate and natural mandible displacement and alignment with a consideration for both the efficiency requirement of minimizing the overall duration of the orthodontic treatment of the subject; and the safety requirement aimed at preventing damages to the subject's teeth.

More specifically, the developers have realized that the safety requirement may be met if collisions between maxillary and mandibular teeth could be minimized due to more accurate mandible alignment in some cases, as the collisions therebetween may result in causing discomfort to the subject, or even teeth damage such as chips and cracks of the teeth enamel, for example. Further, more natural and accurate modeling of mandibular movements could aid in designing and/or manufacturing orthodontic treatment appliances. For example, shape or thickness of orthodontic treatment appliances could be chosen or reviewed in view of modeled mandibular movements, according to some implementations of the present technology. Additionally, more natural and accurate modeling of mandibular movements could also aid in analyzing worn orthodontic appliances in order to assess whether any adjustments to the treatment are needed. Therefore, these methods and systems could allow for manufacturing orthodontic appliances which could deliver more effective, efficient, and safer orthodontic treatments.

More specifically, according to a first broad aspect of the present technology, there is provided a method for modeling mandibular motion, the method executable by an electronic device. The method including acquiring a point cloud representing a mandible of a subject; determining an initial condyle pose of each of a right condyle of the mandible and a left condyle of the mandible; determining a plurality of natural movement parameters for each of the right condyle and the left condyle, the plurality of natural movement parameters including at least: a maximum protrusion displacement, a Bennett angle, and a Sagittal inclination path angle; receiving, from a user via an interface of the electronic device, at least one indication of at least one of: a translation of the mandible, and a rotation of the mandible; determining a first natural movement of the mandible based on receiving the at least one indication of the translation, determining the first natural movement including a protrusion of the mandible followed by a first sagittal inclination of the mandible, the first natural movement being determined based at least in part on the plurality of natural movement parameters; determining a second natural movement of the mandible based on receiving the at least one indication of the rotation, determining the second natural movement including a Bennet movement of the mandible followed by a second sagittal inclination of the mandible, the second natural movement being determined based at least in part on the plurality of natural movement parameters; applying the at least one of the first natural movement and the second natural movement of the point cloud to form a transformed point cloud; creating a model of the mandible having undergone the at least one of the translation and the rotation using the transformed point cloud; and displaying the model of the mandible having undergone the at least one of the translation and the rotation.

In some implementations, the method further includes determining, an orthodontic treatment for the subject based at least in part on the determined transformed point cloud.

In some implementations, the method further includes causing displaying, on an interactive display system operatively connected to the electronic device, the transformed point cloud to display the model of the mandible of the subject, the model being configured to be manipulated by an operator of the interactive display system.

In some implementations, the method further includes determining, in response to manipulation of the model, an orthodontic treatment for the patient.

In some implementations, the method further includes determining hinge movement of the model of the mandible of the subject.

In some implementations, determining the hinge movement includes determining a pivot axis extending through the left condyle and the right condyle; rotating the model of the mandible about the pivot axis; and displaying the rotated model of the mandible by rotating the transformed point cloud.

In some implementations, relative placement of the model of the mandible with a model of a maxilla of the subject is determined using iterative bisection of a minimum distance between the model of the mandible and the model of the maxilla.

In some implementations, the method further includes determining a maximum translation of the mandible.

In some implementations, determining the maximum translation includes determining an initial position ($\vec{A}$) of the mandible; determining a desired final position ($\vec{B}$) of the mandible; and calculating the maximum translation (t) according to:

$$t = \max\left\{\min\left\{\left(\begin{bmatrix} 0 \\ 0 \\ 1 \end{bmatrix} \cdot (\vec{B} - \vec{A})\right), 0\right\}, l\right\},$$

with (l) being the maximum protrusion displacement.

In some implementations, determining the protrusion of the mandible includes calculating a displacement of each of the left condyle and the right condyle; and calculating the displacement includes:

$$\vec{L'} = \vec{L} + \begin{bmatrix} 0 \\ 0 \\ t \end{bmatrix}, \text{ and}$$

$$\vec{R'} = \vec{R} + \begin{bmatrix} 0 \\ 0 \\ t \end{bmatrix},$$

with L being an initial position of the left condyle, R being an initial position of the right condyle, L' being a desired final position of the left condyle, R' being a desired final position of the right condyle.

In some implementations, the Bennett movement is determined based at least on part the at least one indication of the rotation; and the Bennett movement is determined by a Bennett movement calculation including rotating one of the left condyle and the right condyle about an other one of the left condyle and the right condyle, and applying a lateral shift to the left condyle and the right condyle.

In some implementations, the at least one indication of the translation is a first indication; the at least one indication of the rotation is a second indication; and further including receiving the first indication and the second indication, determining the first natural movement and the second natural movement, and applying the first natural movement and the second natural movement of the point cloud to form the transformed point cloud.

In some implementations, the method further includes manufacturing an orthodontic treatment appliance for the subject, a design of the orthodontic treatment appliance being based at least in part on the determined transformed point cloud.

In some implementations, the method further includes analyzing at least one orthodontic treatment appliance for the subject, based at least in part on the determined transformed point cloud.

According to another broad aspect of the present technology, there is provided a system for modeling mandibular motion. The system includes at least one interface device; and an electronic device including a processor. The processor is configured for executing method steps including: acquiring a point cloud representing a mandible of a subject; determining an initial condyle pose of each of a right condyle of the mandible and a left condyle of the mandible; determining a plurality of natural movement parameters for each of the right condyle and the left condyle, the plurality of natural movement parameters including at least: a maximum protrusion displacement, a Bennett angle, and a Sagittal inclination path angle; receiving, from a user via an interface of the electronic device, at least one indication of at least one of: a translation of the mandible, and a rotation of the mandible; determining a first natural movement of the mandible based on receiving the at least one indication of the translation, determining the first natural movement including a protrusion of the mandible followed by a first sagittal inclination of the mandible, the first natural movement being determined based at least in part on the plurality of natural movement parameters; determining a second natural movement of the mandible based on receiving the at least one indication of the rotation, determining the second natural movement including a Bennet movement of the mandible followed by a second sagittal inclination of the mandible, the second natural movement being determined based at least in part on the plurality of natural movement parameters; applying the at least one of the first natural movement and the second natural movement to the point cloud to form a transformed point cloud; creating a model of the mandible having undergone the at least one of the translation and the rotation using the transformed point cloud; and displaying the model of the mandible having undergone the at least one of the translation and the rotation via the at least one interface device.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations or embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
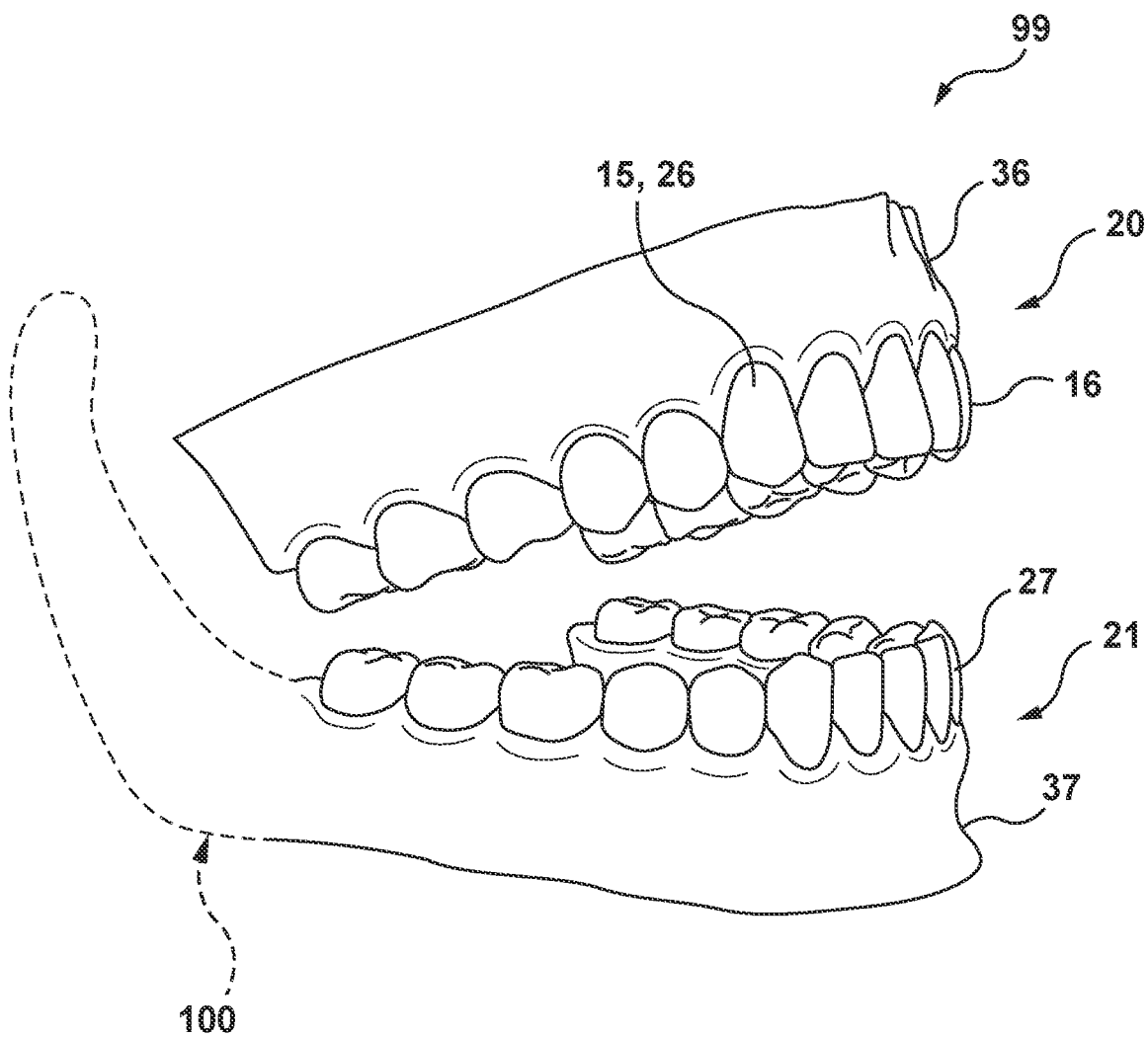
FIG. 1 depicts a perspective view of a 3D model of an upper arch form, a lower arch form, and a mandible of a subject, in accordance with non-limiting embodiments of the present technology.

Certain aspects and embodiments of the present technology are directed to methods of and systems for developing a more efficient orthodontic treatment and/or more efficient orthodontic treatment appliance production for a subject (also referred to herein as a "patient"), which also considers certain safety constraints.

It should be expressly understood that, in the context of the present specification, the term "orthodontic treatment" is broadly referred to as any type of medical intervention aimed at correcting malocclusions associated with the teeth of the patient, including surgical and non-surgical manipulations, such as, but not limited to, using one or more of aligners, brackets, multi-strand wires, strips, retainers, and plates. Further, the orthodontic treatment, as referred to herein, may be determined automatically by a specific software, based on respective image data and input parameters associated with the subject, or at least semi-automatically with input from a professional practitioner in the field of dentistry (such as an orthodontist, a maxillofacial surgeon, for example).

More specifically, certain aspects and embodiments of the present technology comprise a computer-implemented method for modeling mandibular motion for a subject, based on a 3D model of the mandible of the subject, for the purposes of planning an orthodontic treatment or for design and/or analysis of an orthodontic treatment appliance. In certain aspects and embodiments of the present technology, the mandibular motion model is used for modeling movement and relative placement of the mandible to the upper arch form for (1) optimizing placement of the mandible for relative alignment of the teeth of the upper and lower arch forms, while (2) limiting displacement of the mandible to stay within natural limits of displacement of the mandible for a particular subject in order to aid in achieving safer and more efficient orthodontic treatments for the subject.

Certain non-limiting embodiments of the present technology minimize, reduce or avoid some of the problems noted in association with the prior art. For example, by implementing certain embodiments of the present technology in respect of modeling mandibular motion for a subject, the following advantages may be obtained: The user, such as a dentist, may prefer to model placement and movement of the mandible in terms of commonly used independent motions (e.g., translation and rotation). Due to anatomical constraints, however, mandibles cannot make pure rotation and translation movements. By the present technology, input in the form of independent rotation and translation motions are translated into true mandibular motions and displayed or stored and later used in treatment planning/orthodontic appliance design in order to provide more natural and accurate mandibular movement modeling. In this regard, methods and systems provided herein, according to certain non-limiting embodiments of the present technology, could allow a reduction of an overall duration of the orthodontic treatment and, at the same time, increasing safety thereof. For example, increasing safety of the orthodontic treatment may be achieved by applying orthodontic devices (such as aligners) that adjust mandibular pose and movement in a manner more closely aligned with natural displacement and movement of the mandible. In some cases, it should be noted, correction of a bite (malocclusion) could be aesthetic or could be performed for medical considerations, such as to aid in treatment or prevention of medical conditions including but not limited to temporomandibular joint (TMJ) disorders, sleep apnea, and gum damage.

For another example, the safety criteria of orthodontic treatment could be addressed in at least some embodiments of the present technology by allowing inspection of tooth contact between the maxillary and mandibular arch forms at different intermediate or final stages of the orthodontic treatment. For instance, a particular adjusted positioning of a given tooth may approved by the dental professional within one of the arch forms. Upon inspection of jaw movement using the present technology, however, it may be determined that the tooth, in its adjusted position, could collide with one or more teeth of the opposing arch form. In this way, modeling of the jaw movement could aid in increasing safety of orthodontic treatments.

For another example, reducing an overall duration of the orthodontic treatment while incorporating safety considerations may be achieved by analyzing orthodontic treatment devices (such as aligners) based on the more natural mandibular pose and movement such that the form, thickness, and other aspects of the orthodontic treatment devices are more closely aligned with natural displacement and movement of the mandible. In this way, the present technology can aid in balancing the considerations of preventing damage while minimizing time of treatment.

Orthodontic Treatment

Referring initially to FIG. 1, there is depicted a perspective view of a non-limiting example of a 3D model 99 representing a tooth and jaw configuration of the upper arch form 20 (also referred to as the "maxillary arch form" 20) and the lower arch form 21 (also referred to as the "mandibular arch form") of the subject, in accordance with non-limiting embodiments of the present technology.

The upper arch form 20 includes upper teeth 16 (also referred to as "maxillary teeth") and an upper gingiva 36, and the lower arch form 21 includes lower teeth 27 (also referred to as "mandibular teeth") supported by a mandible 100 (also referred to as the "lower jaw") and a lower gingiva 37. As it can be appreciated, the upper teeth 16 and the lower teeth 27 are represented, in the 3D model 99, by respective crown portions associated therewith.

Figure 2:
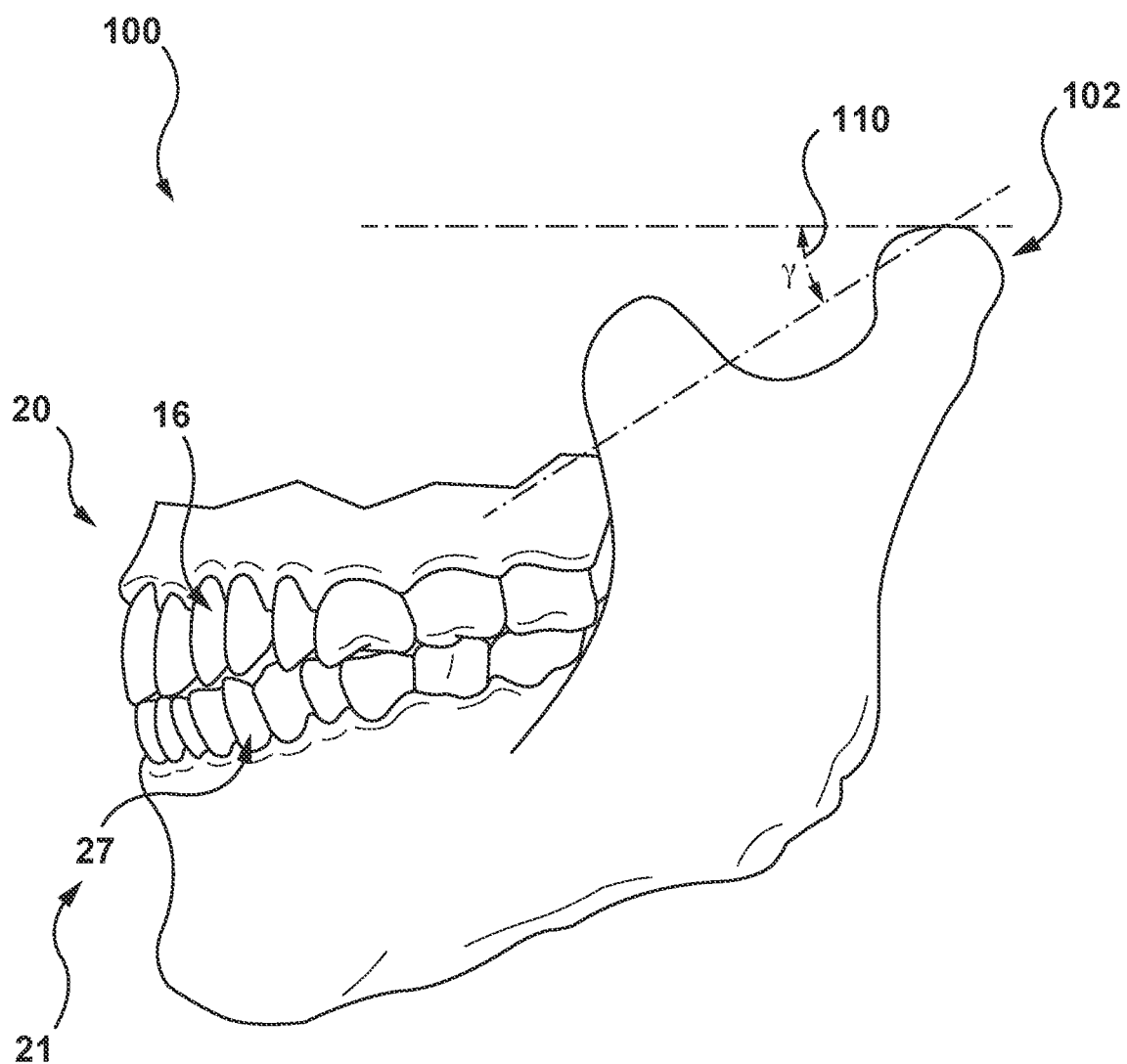
FIG. 2 depicts a left side elevation view of the model of the upper arch form, the lower arch form, and the mandible of FIG. 1.
Figure 3:
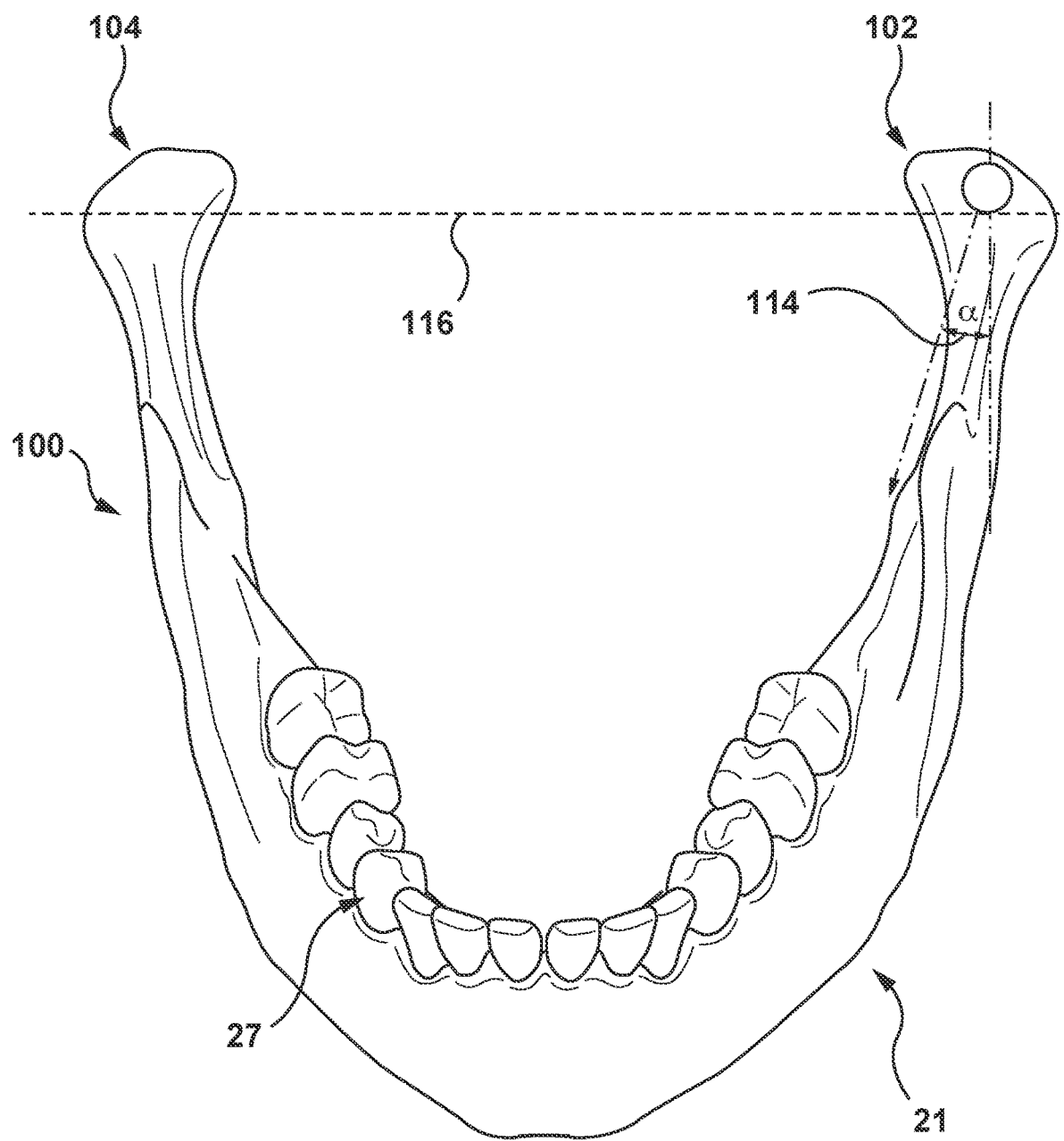
FIG. 3 depicts a top, front side perspective view of the lower arch form and mandible of FIG. 1.

With reference to FIGS. 2 and 3, the lower arch form 21 and the mandible 100 are illustrated in further detail. The mandible 100 is pivotally connected to the skull (not shown) by a left condyle 102 and a right condyle 104. The mandible 100 moves relative to the maxillary arch form 20 through inter-related three-dimensional motions generally dictated by the anatomy of the mandible and the surrounding muscle and bone structure, including for example the form of the condyles 102, 104 of the mandible 100. The movement of the mandible 100 are generally described by a plurality of natural movement parameters, including: the Sagittal inclination path, Bennett motion, and hinge motion, as well as natural movement limits such as a maximum protrusion distance. While the natural movement parameters are referred to generally for the two condyles 102, 104 herein, it should be noted that each condyle 102, 104 will have a value of each of the natural movement parameters specific to that condyle 102, 104. It is possible, of course, that the value of a given natural parameter could be the same for both condyles 102, 104 in some instances.

When protruding, as well as when making some rotation motion, each condyle 102, 104 of the mandible 100 moves along an articulator surface of the skull which extends generally diagonally from an origin of the corresponding condyle 102, 104. This is referred to as a Sagittal inclination path, described by a Sagittal inclination angle ($\gamma$) to horizontal (identified by angle 110 in FIG. 2). Bennett motion, very briefly, is lateral movement of the mandible 100 produced when the condyles 102, 104 slide along the adjacent bone structure (the mandibular fossae) during sideways mandibular movement. A Bennett angle ($\alpha$) for each condyle 102, 104 (identified by angle 114 in FIG. 3) is thus the angle formed by a sagittal plane passing through the origin position of the condyle 102, 104 and the path of the corresponding condyle 102, 104 during sideways or lateral movement when viewed in a horizontal plane. As is further illustrated in FIG. 3, hinge motion of the mandible 100 refers to rotational movement of the two condyles 102, 104 about a line 116 connecting centers of rotation of the condyles 102, 104.

Determination of natural motion of the mandible 100 according to non-limiting embodiments of the present technology, based on cartesian input movements from a user (such as a dental professional), in order to model mandibular motion will be described in more detail below. These natural mandibular movements, can, in some non-limiting examples, be applied to design, manufacture, or analysis of one or more orthodontic treatment appliances, also referred to as orthodontic devices.

In various non-limiting embodiments of the present technology, the orthodontic treatment appliance may comprise orthodontic devices of different types, shapes, sizes and configurations, such as those including, without limitation, aligners, brackets, multi-strand wires, strips, retainers, and plates.

Figure 4:
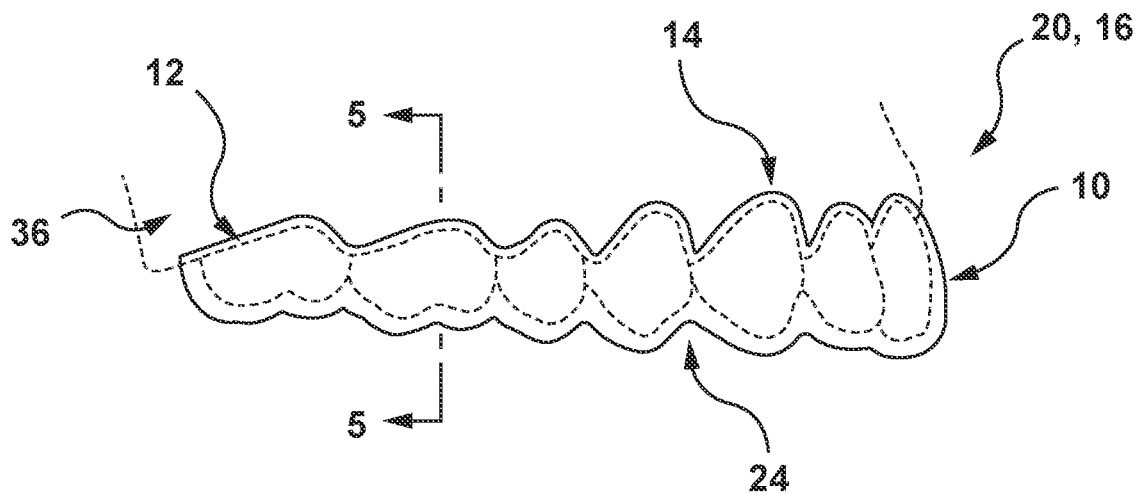
FIGS. 4 and 5 depict side and cross-sectional views, respectively, of a personalized orthodontic treatment appliance applied to the subject's teeth that may be configured to treat a misalignment of the subject's teeth of FIG. 1, in accordance with certain non-limiting embodiments of the present technology.
Figure 5:
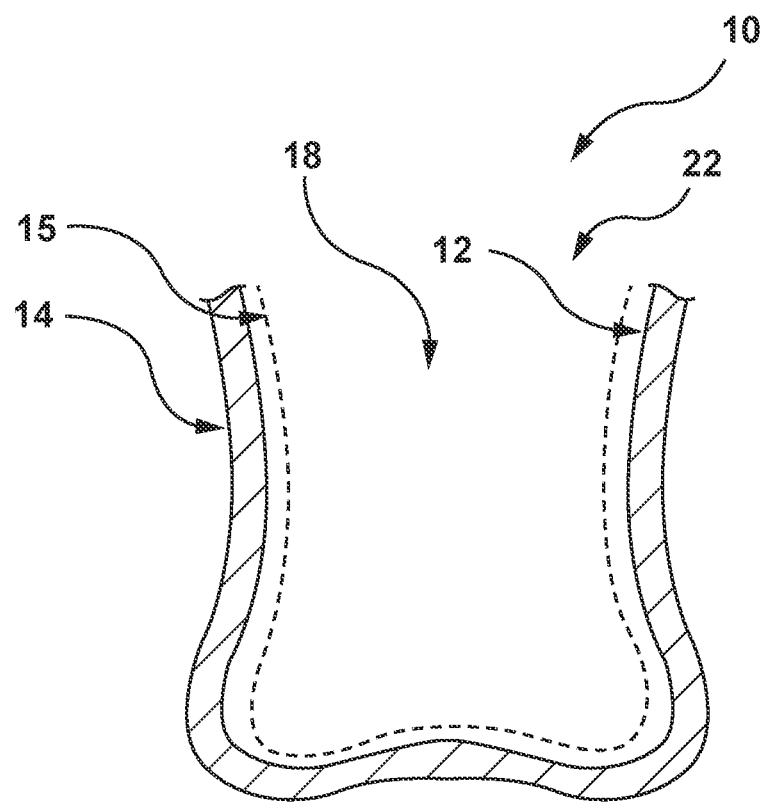

In specific non-limiting embodiments of the present the present technology, the orthodontic treatment appliance may include an aligner. With reference to FIGS. 4 and 5, there is depicted an aligner 10 applied to at least some of the upper teeth 16, in accordance with certain non-limiting embodiments of the present technology. Although not illustrated explicitly, embodiments of the aligner 10 could be configured to be applied to some or all of the lower teeth 27.

The aligner 10 comprises an inner surface 12 and an outer surface 14. The inner surface 12 defines a channel 18, which is configured, in some non-limiting embodiments of the present technology, for receiving crown portions of at least some of the upper teeth 16. In other non-limiting embodiments of the present technology, the channel 18 of the aligner 10 may be configured to receive crown portions of all of the upper teeth 16. At least one edge of the channel 18 is shaped for following a gum line along the upper gingiva 36.

In accordance with the non-limiting embodiments of the present technology, a size, a form factor (such as a U-shape or a V-shape, for example), and a configuration of the aligner 10, including a material and a thickness thereof, depend generally on a particular malocclusion disorder of the subject (such as a misalignment of one or more of the upper teeth 16), at which the orthodontic treatment is aimed. However, as an example, in some non-limiting embodiments of the present technology, the thickness of the aligner 10 may be about 0.7 mm. In other non-limiting embodiments of the present technology, the thickness is selected from 0.7 mm, 0.75 mm, 0.8 mm, 0.85 mm, 0.9 mm, 0.95 mm, and 1.0 mm. In yet other non-limiting embodiments of the present technology, the aligner 10 may have regions of variable thickness, such as in interdental regions, as an example.

According to certain non-limiting embodiments of the present technology, the aligner 10 may be made of a polymer, such as a thermoplastic material. In other non-limiting embodiments of the present technology, the aligner 10 may be made of poly-vinyl chloride (PVC). In yet other non-limiting embodiments of the present technology, the aligner 10 may be made of polyethylene terephthalate glycol (PETG). Other suitable materials can also be used to form the aligner 10.

It is appreciated that, in accordance with certain non-limiting embodiments of the present technology, the aligner 10 may be used for treating different types of teeth misalignment or malocclusion, including but not limited to one or more of: closing gaps ("space closure"), creating/widening gaps, tooth rotation, tooth intrusion/extrusion, and tooth translation, to name a few. It should further be noted that in certain non-limiting embodiments of the present technology, applying the aligner 10 to the upper teeth 16 may further include applying specific attachments (also known as "fixing blocks") thereto.

As it may become apparent, the aligner 10 may be designed in such a way that its current configuration is representative of a desired position of the upper teeth 16 at a given stage of the orthodontic treatment, which thus allows, due to stiffness properties of the material of the aligner 10, imposing a respective force onto each crown portion of a respective one of the upper teeth 16 appointed for the orthodontic treatment.

Thus, referring back to FIG. 1, in order to cause a selected tooth 16 to reach an aligned or corrected position, first, various configurations of the aligner 10 may be used to sequentially move one or more of the upper teeth 16 before the selected tooth 16, thereby preparing space for the selected tooth 16 to be moved into the space.

Although in the depicted embodiments of FIGS. 4 and 5 the aligner 10 is configured to be applied onto the upper teeth 16, in other non-limiting embodiments of the present technology, a certain configuration of the aligner 10 may be applied to one or more teeth 27 of the lower arch form 21 of the subject aimed at respective malocclusion disorders.

System

Figure 6:
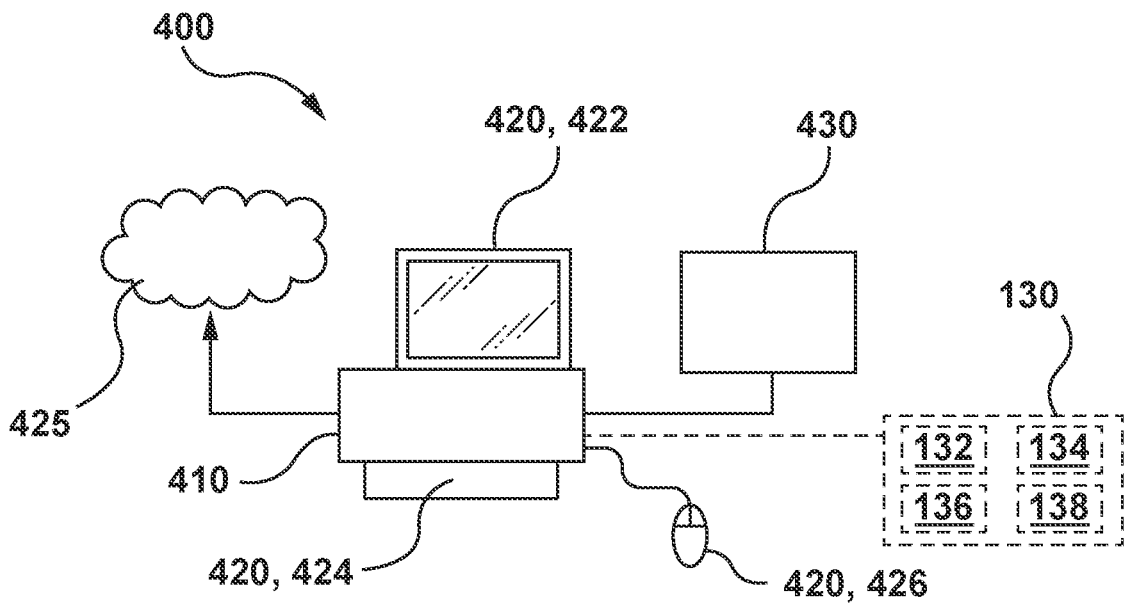
FIG. 6 depicts a schematic diagram of a system for planning an orthodontic treatment, in accordance with certain non-limiting embodiments of the present technology.
Figure 7:
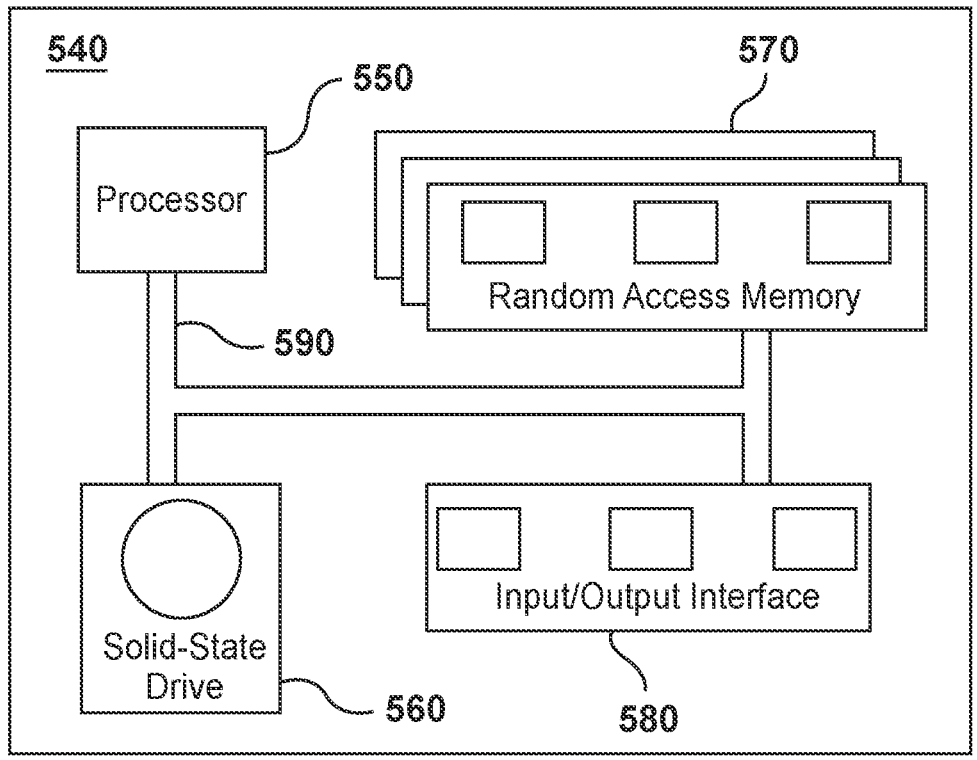
FIG. 7 depicts a schematic diagram of a computing environment of the system of FIG. 6, in accordance with certain embodiments of the present technology.

Referring to FIGS. 6 and 7, there is depicted a schematic diagram of a system 400 suitable for modeling mandibular movement, in accordance with certain non-limiting embodiments of the present technology.

It is to be expressly understood that the system 400 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 400 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 400 may provide in certain instances simple implementations of the present technology, and that where such is the case they have been presented in this manner as an aid to understanding. As persons skilled in the art would further understand, various implementations of the present technology may be of a greater complexity.

In certain non-limiting embodiments of the present technology, the system 400 of FIG. 4 comprises a computer system 410. The computer system 410 may be configured, by pre-stored program instructions, to perform, based on image data associated with the subject, methods described herein for modeling mandibular motion for the subject, according to certain non-limiting embodiments of the present technology, as will be described further below.

To that end, in some non-limiting embodiments of the present technology, the computer system 410 is configured to receive image data pertaining to the subject or to a given stage of the orthodontic treatment. According to some non-limiting embodiments of the present technology, the computer system 410 may receive the image data via local input/output interface (such as USB, as an example, not separately depicted). In other non-limiting embodiments of the present technology, the computer system 410 may be configured to receive the image data over a communication network 425, to which the computer system 410 is communicatively coupled.

In some non-limiting embodiments of the present technology, the communication network 425 is the Internet and/or an Intranet. Multiple embodiments of the communication network may be envisioned and will become apparent to the person skilled in the art of the present technology. Further, how a communication link between the computer system 410 and the communication network 425 is implemented will depend, inter alia, on how the computer system 410 is implemented, and may include, but is not limited to, a wire-based communication link and a wireless communication link (such as a Wi-Fi communication network link, a 3G/4G communication network link, and the like).

It should be noted that the computer system 410 can be configured for receiving the image data from a vast range of devices. Some of such devices can be used for capturing and/or processing data pertaining to maxillofacial and/or cranial anatomy of the subject. In certain embodiments, the image data received from such devices is indicative of properties of anatomical structures of the subject, including but not limited: teeth, intraoral mucosa, maxilla, mandible, temporomandibular joint, and nerve pathways, among other structures. In some non-limiting embodiments of the present technology, at least some of the image data is indicative of properties of external portions of the anatomical structures, for example dimensions of a gingival sulcus, and dimensions of an external portion of a tooth (e.g., a crown of the tooth) extending outwardly of the gingival sulcus. In some embodiments, the image data is indicative of properties of internal portions of the anatomical structures, for example volumetric properties of bone surrounding an internal portion of the tooth (e.g., a root of the tooth) extending inwardly of the gingival sulcus. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics.

In some embodiments, the image data includes datasets generally intended for the practice of periodontics.

In non-limiting embodiments of the present technology, the computer system 410 is configured to receive the image data associated with the subject directly from an imaging device 430 (shown schematically in FIG. 6) communicatively coupled thereto. Broadly speaking the imaging device 430 may be configured (for example, by a processor 550 depicted in FIG. 7) to capture and/or process the image data of the upper teeth 16 and the periodontium (not depicted) of the subject. In certain non-limiting embodiments of the present technology, the image data may include, for example, one or more of: (1) images of external surfaces of respective crown portions (such as the crown portions) of the teeth 16, 27 (2) images of an external surface of the periodontium including those of the upper or lower gingiva 37, the alveolar maxillary bone (not depicted), and images of superficial blood vessels and nerve pathways associated with the teeth 16, 27; and (3) images of an oral region. By doing so, the imaging device 430 may be configured, for example, to capture image data of the lower arch form 21 and the mandible 100 of the subject. In another example, the imaging device 430 may also be configured to capture and/or process image data of the upper arch form 20 associated with the subject without departing from the scope of the present technology. It should be noted that the image data may include two-dimensional (2D) data and/or three-dimensional data (3D). In certain embodiments, the image data includes at least one dataset derived from one or more of the following imaging modalities: computed tomography (CT), radiography, magnetic resonance imaging, ultrasound imaging, nuclear imaging and optical imaging. Any medical imaging modality is included within the scope of the present technology. In certain embodiments, the image data includes 2D data, from which 3D data may be derived, and vice versa.

In certain embodiments, the imaging device 430 includes an image capture sensor for capturing imaging data and a processor arranged to receive and transmit the imaging data. The processor may be further configured to process the image data to generate digital, 3D models based on the image data, for example. Alternatively, it is contemplated that the processing of the image data may be performed by the computer system 410. The resulting image data received by the computer system 410 is typically structured as a binary file or an ASCII file, may be discretized in various ways (e.g., point clouds, polygonal meshes, pixels, voxels, implicitly defined geometric shapes), and may be formatted in a vast range of file formats (e.g., STL (standard tessellation language), OBJ (object file format), PLY (Polygon file format), DICOM (digital imaging and communications in medicine), and various software-specific, proprietary formats). Any image data file format is included within the scope of the present technology.

Alternatively, as contemplated in other embodiments, the imaging device 430 may instead be a desktop scanner (not shown) for indirect digitization of intraoral anatomy via a replica (i.e., a dental model). In some such embodiments, the replica is obtainable via a dental impression (i.e., a negative mold) made of a material (such as polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica. The replica may then be retrieved from the dental impression and digitized by the desktop scanner to generate the digital surface model. Alternatively, in other embodiments, the digital surface model may be generated via digitizing the dental impression.

As will be described in greater detail below, according to the non-limiting embodiments of the present technology, the processor 550 may be configured to: (1) receive the image data associated with the subject's teeth; (2) based on the received image data, determine a point cloud describing the mandible, mandibular teeth, and maxillary teeth; (3) receive instructions, from a user, to model one or more mandibular motions; and (4) determine the orthodontic treatment for the subject. According to some non-limiting embodiments of the present technology, having received the image data, the processor 550 may be configured to generate 3D models of arch forms of the subject based at least in part on information derived from or produced by the imaging device 430.

In some non-limiting embodiments of the present technology, the imaging device 430 may comprise an intra-oral scanner enabling to capture direct optical impressions of the upper arch form 20 of the subject. In a specific non-limiting example, the intraoral scanner can be of one of the types available from MEDIT, corp. of 23 Goryeodae-ro 22-gil, Seongbuk-gu, Seoul, South Korea. It should be expressly understood that the intraoral scanner can be implemented in any other suitable equipment.

In other non-limiting embodiments of the present technology, the imaging device 430 may comprise a desktop scanner enabling to digitize a mold representing the arch forms of the subject. In this regard, the mold may have been obtained via dental impression using a material (such as a polymer, e.g. polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica.

In a specific non-limiting example, the desktop scanner can be of one of the types available from Dental Wings, Inc. of 2251, ave Letourneux, Montreal (QC), Canada, H1V 2N9. It should be expressly understood that the desktop scanner can be implemented in any other suitable equipment.

In order to image mandibular condyles, in non-limiting embodiments of the present technology, the imaging device 430 may comprise a cone beam computed tomography (CBCT) scanner. Generally speaking, the CBCT scanner comprises software and hardware allowing for capturing data using a cone-shaped X-ray beam by rotating around the subject's head. This data may be used to reconstruct 3D representations of the following regions of the subject's anatomy: dental (teeth and gum, for example); oral and maxillofacial region (mouth, jaws, and neck); and ears, nose, and throat ("ENT"). In some other non-limiting embodiments of the present technology, the imaging device 430 could additionally or alternatively include a magnetic resonance imaging (MRI) scanner for imaging the mandibular condyles.

In a specific non-limiting example, the CBCT scanner can be of one of the types available from 3Shape, Private Limited Company of Holmens Kanal 7, 1060 Copenhagen, Denmark. It should be expressly understood that the CBCT scanner can be implemented in any other suitable equipment.

Further, it is contemplated that the computer system 410 may be configured for processing of the received image data. The resulting image data of the lower arch form 21 and the mandible 100 received by the computer system 410 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology. For implementing functions described above, the computer system 410 may further comprise a corresponding computing environment.

With reference to FIG. 7, there is depicted a schematic diagram of an electronic device 540, also referred to as a computing environment 540, suitable for use with some implementations of the present technology. The computing environment 540 includes various hardware components including one or more single or multi-core processors collectively represented by the processor 550, a solid-state drive 560, a random access memory 570 and an input/output interface 580. Communication between the various components of the computing environment 540 may be enabled by one or more internal and/or external buses 590 (e.g. a PCI bus, universal serial bus, IEEE 1394 "Firewire" bus, SCSI bus, Serial-ATA bus, ARINC bus, etc.), to which the various hardware components are electronically coupled.

The input/output interface 580 allows enabling networking capabilities such as wire or wireless access. As an example, the input/output interface 580 comprises a networking interface such as, but not limited to, a network port, a network socket, a network interface controller and the like. Multiple examples of how the networking interface may be implemented will become apparent to the person skilled in the art of the present technology. For example, but without being limiting, the input/output interface 580 may implement specific physical layer and data link layer standard such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 560 stores program instructions suitable for being loaded into the random access memory 570 and executed by the processor 550, according to certain aspects and embodiments of the present technology. For example, the program instructions may be part of a library or an application.

In some non-limiting embodiments of the present technology, the computing environment 540 is implemented in a generic computer system, which is a conventional computer (i.e. an "off the shelf" generic computer system). The generic computer system may be a desktop computer/personal computer but may also be any other type of electronic device such as, but not limited to, a laptop, a mobile device, a smart phone, a tablet device, or a server.

As persons skilled in the art of the present technology may appreciate, multiple variations as to how the computing environment 540 can be implemented may be envisioned without departing from the scope of the present technology.

Referring back to FIG. 4, the computer system 410 has at least one interface device 420 for providing an input or an output to a user of the system 400, the interface device 420 being in communication with the input/output interface 580. In the embodiment of FIG. 6, the interface device is a screen 422. In other non-limiting embodiments of the present technology, the interface device 420 may be a monitor, a speaker, a printer or any other device for providing an output in any form such as an image form, a written form, a printed form, a verbal form, a 3D model form, or the like.

In the depicted embodiments of FIG. 6, the interface device 420 also comprises a keyboard 424 and a mouse 426 for receiving input from the user of the system 400. Other interface devices 420 for providing an input to the computer system 410 can include, without limitation, a USB port, a microphone, a camera or the like.

The computer system 410 may be connected to other users, such as through their respective clinics, through a server (not depicted). The computer system 410 may also be connected to stock management or client software which could be updated with stock when the orthodontic treatment has been determined and/or schedule appointments or follow-ups with clients, for example.

Manufacturing

The system 400 could, in some embodiments, further include a manufacturing system 130 (shown schematically) for making the aligner 10, operatively communicable with the computer system 410. While described as being generally co-located with other portions of the system 400, it is also contemplated that the manufacturing system 130 could be disposed at a separate location and be communicatively connected to remaining portions of the system 400 as described above, such as by an internet connection. In some such implementations, the computer system 410 could send manufacturing instructions to the manufacturing system 130, for example. Details relating to the manufacturing system and processes implemented therewith will be described briefly herein. Further information can be found in U.S. Pat. No. 10,717,208, entitled "Methods and Systems for Thermoforming Orthodontic Aligners", issued on Jul. 21, 2020, the entirety of which is incorporated herein by reference.

In certain embodiments, the manufacturing apparatus 130 includes a thermoforming device 132 (FIG. 8) for shaping a precursor aligner into the aligner 10 using an aligner mold 46, by a process which will be described generally hereinbelow.

In some embodiments, the manufacturing apparatus 130 further includes a computer-assisted post-processing device 134 (shown schematically), such as a computer numerical control (CNC) milling device or a CNC laser cutting device for further shaping the aligner 10 into a post-processed aligner (not shown). The post-processing of the aligner 10 may include one or both of (i) forming recesses or openings in the aligner body 14, and (ii) forming an edge of the channel 18. In some such embodiments, the post-processing device 134 is operatively connectable to the computer system 410 for receiving operating instructions from the computer system 410 for post-processing the aligner 10. The operating instructions may for example be derived from a digital model indicative of a desired aligner (not shown).

In some embodiments, the manufacturing apparatus 130 further includes an auxiliary manufacturing device 136 (shown schematically) for making the aligner mold 46. The auxiliary manufacturing device 136 is an additive manufacturing device, also referred to in some cases as a 3-D printing device. It is also contemplated that, in other embodiments, a CNC milling device may be used instead. In certain embodiments, an auxiliary manufacturing device may be used for making precursor aligners, for example an additive manufacturing device arranged for fabricating customized precursor aligners.

In some embodiments, the computer system 410 is configured to receive image data from the imaging device 430 pertaining to the subject or to a given orthodontic treatment (such as a digital model of the aligner 10), as is described above. The computer system 410 may use the image data for determining the thermoforming parameters. In certain embodiments, the computer system 410 is arranged to determine an orthodontic treatment using the image data.

In certain non-limiting embodiments, the system 400 further includes a robotic system 138 (shown schematically) arranged relative to the thermoforming device 132, for handling one or more of the aligner mold 46, the precursor aligner, and the aligner 10. In some non-limiting embodiments, the robotic system could be omitted.

In certain embodiments, the system 400 and/or computer system 410 could be connectable to one or more of the imaging device 430, the thermoforming device 132, the post-processing device 134, the auxiliary manufacturing device 136 and the robotic system 138 (where included) via a communication network. In some embodiments, the communication network is the Internet and/or an Intranet. Multiple embodiments of the communication network may be envisioned and would be apparent to the person skilled in the art of the present technology.

Figure 8:
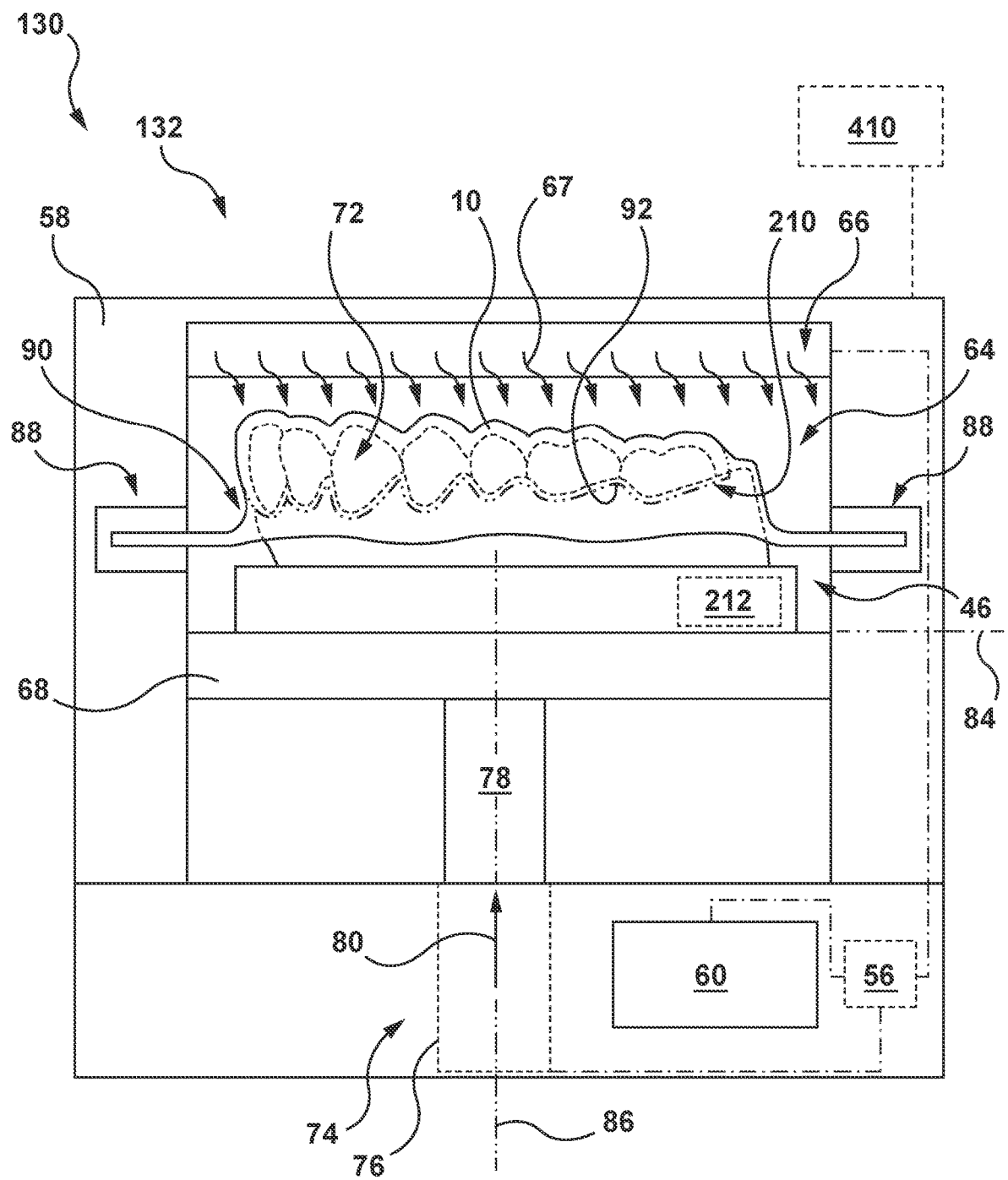
FIG. 8 depicts a schematic diagram of a thermoforming device, an aligner mold and an orthodontic treatment device being formed in the thermoforming device, according to certain embodiments of the present technology.

With reference to FIG. 8, the thermoforming device 132 is schematically represented according to certain embodiments of the present technology. The thermoforming device 132 is arranged to receive the aligner mold 46 and the precursor aligner, and to shape the precursor aligner onto the aligner mold 46 during a thermoforming operation, in which heat and pressure imparted to the precursor aligner during shaping are controlled.

The thermoforming device 132 has a device body 58 housing a control unit 56. The control unit 56 is arranged to receive a signal indicative of operating instructions from the computer system 410. The control unit 56 can also be arranged to receive a signal indicative of operating instructions from a user interface 60 connected to the device body 58. Based on the signal, the control unit 56 selectively causes the thermoforming device 132 to operate according to one or more given operating parameters (e.g., thermoforming temperature, thermoforming pressure) values, as will be further described hereinbelow.

The device body 58 defines a chamber 64 having a base 68 on which the aligner mold 46 may be supported. The chamber 64 is sized for receiving the aligner mold 46 and the precursor aligner.

The aligner mold 46 has a base portion and an anatomic portion. The base portion 70 comprises a code-bearing portion 212 bearing a code indicative of the aligner mold 46. It is contemplated that the code-bearing portion 212 could be disposed elsewhere on the aligner mold 46. The anatomic portion 72 is adjacent the base portion and includes a teeth portion representing teeth of the subject being disposed in a desired configuration as determined per the given orthodontic treatment plan. The anatomic portion also comprises a mucosa portion including a shape of the gingiva and gumline adjacent the teeth 22 of the subject. The mucosa portion may also include a shape of vestibular tissue and/or oral cavity-lining tissue, although it does not have to be the case. The teeth and mucosa portions together are inclusive of a portion of the anatomic portion 72 of the aligner mold 46 representing a shaping portion 210 of the aligner mold 46 to be used for shaping the precursor aligner.

The thermoforming device 132 also includes a heating element 66 for generating heat 67 inside the chamber 64. Moreover, the heating element 66 is operable for selectively adjusting its heating temperature based on a desired thermoforming temperature value. The control unit 56 is electronically connected to the heating element 66 for selectively causing the heating temperature to be adjusted based on the desired thermoforming temperature value. In this embodiment, the thermoforming device 132 has a range of thermoforming temperature values between about 180 Celsius and 260 Celsius.

The platform 68 and the heating element 66 are configured relative to one another such that when the base portion 70 of the aligner mold 46 is disposed on the platform 68, the anatomic portion 72 of the aligner mold 46 faces the heating element 66. The thermoforming device 132 includes a pneumatic actuator 74 in fluid connection with a compressor (not shown). The pneumatic actuator has a fixed portion 76 connected to the body 58 and a movable portion 78 connected to the platform 68. The movable portion 78 is slidably connected to the fixed portion 76. The pneumatic actuator 74 is structured for converting energy in the form of pressure received from the compressor into a pushing force 80 for moving its movable portion 78 relative to its fixed portion 76. The pneumatic actuator 74 is controllable for selectively limiting the pressure imparted by the compressor based on a desired thermoforming pressure value so as to selectively move the movable portion 78. The control unit 56 is electronically connected to the pneumatic actuator 74 for selectively causing the movable portion 78 to be moved by the pushing force, the pushing force being commensurate to the selected desired thermoforming pressure value. In this embodiment, the desired thermoforming pressure value is selectable between 2 Bar and 10 Bar. The pneumatic actuator 74 is operatively connected to the platform 68, via the movable portion 78, for moving the platform 68 relative to the chamber 64 from a first platform position to a second platform position 84 along a thermoforming axis 86, the second platform position 84 being closer to the heating element 66. Also, it should be noted that the heating element 66 is configured relative to the chamber 64 so as to remain spaced from the platform 68 when the platform 68 is in either of the first 82 or the second platform positions 82, 84. In other embodiments, other types of actuators, such as hydraulic and electric actuators, are contemplated as alternatives to the pneumatic actuator 74.

The thermoforming device 132 also includes a securing mechanism 88 (not shown in detail) configured for retaining a position of the precursor aligner in the chamber 64, particularly during the thermoforming operation. In this case, the securing mechanism 88 is a clamp. In other embodiments, the securing mechanism 88 can be arranged to retain the precursor aligner in a different manner. The securing mechanism 88 is arranged relative to the heating element 66 such that when the precursor aligner is being retained by the securing mechanism 88, the precursor aligner can be exposed to heat radiating from the heating element 66 to cause a material temperature of the precursor aligner to increase to a temperature substantially equivalent to the desired thermoforming temperature.

In some embodiments, the securing mechanism 88 is configurable between an open configuration for removably receiving the precursor aligner and a closed configuration for retaining the precursor aligner. The control unit 56 is electronically connected to the securing mechanism 88 for selectively causing the securing mechanism 88 to be configured in the open configuration or in the closed configuration.

Modeling Method

Given the architecture and the examples provided hereinabove, it is possible to execute a method for modeling movements of the mandible 100 of the subject using a point cloud representation for orthodontic treatment planning for the subject. In some cases, the present technology could additionally or alternatively serve for manufacturing or analyzing one or more orthodontic treatment appliance. Planning the orthodontic treatment could include, for example, designing one or more orthodontic treatment appliance, such as the aligners 10.

Figure 9:
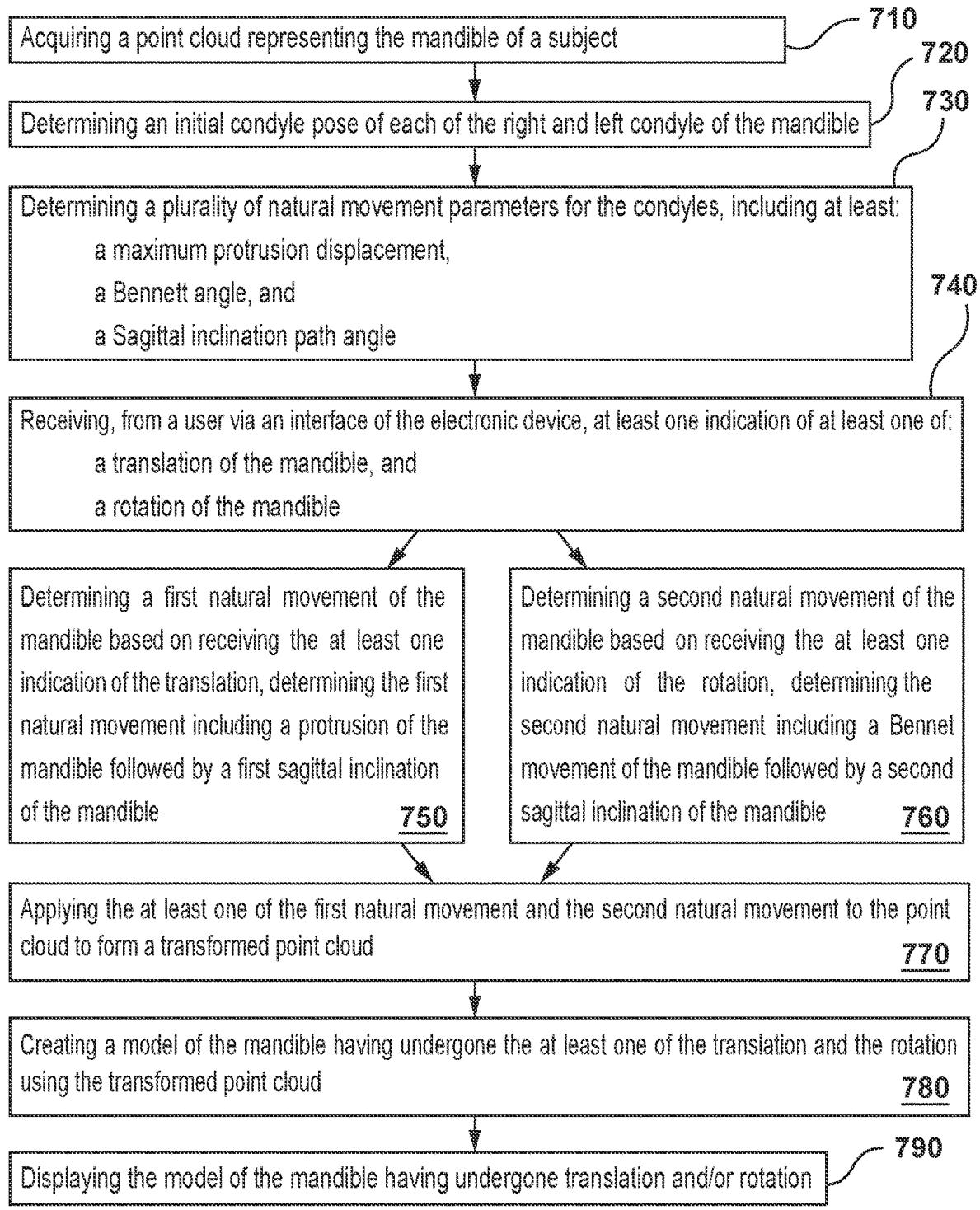
FIG. 9 depicts a flowchart of a method for modeling mandibular movement for the subject for the orthodontic treatment for the subject's teeth, in accordance with certain embodiments of the present technology.

With reference to FIG. 9, there is depicted a flowchart of a method 700, according to certain non-limiting embodiments of the present technology. The method 700 is executed by an electronic device, such as the processor 550 of the computing environment 540. In some embodiments, the method 700 could be implemented by a different computer-implemented device.

The method 700 commences, at step 710, with acquiring, by the electronic device 540, a point cloud representing the mandible 100 of the subject. In some non-limiting embodiments, the point cloud could be produced from image data associated with the subject by the electronic device 540. In some implementations, the point cloud could be produced by another computer-implemented system. In certain non-limiting embodiments of the present technology, the electronic device 540 or the processor 550 may be configured to generate the point cloud representative of the lower arch form 21 and the mandible 100 using the imaging device 430. In some cases, the point cloud could be determined prior to commencing the method 700. In such an implementation, the point cloud could then be acquired by the electronic device 540 or the processor 550, for instance, by retrieving the point cloud from a readable storage device (not shown) communicatively coupled to the electronic device 540. In some cases, it is also contemplated that the electronic device 540 or the processor 550 may be configured to generate the point cloud representative of the lower arch form 21 and the mandible 100 from another representation of the lower arch form 21 and the mandible 100 stored to or retrieved by the computing system 410. For example, the point cloud could be created from a mesh grid representing the lower arch form 21 and the mandible 100.

The method 700 continues, at step 720, with determining an initial condyle pose of each of the left condyle 102 and the right condyle 104. The initial condyle pose is a "starting" position for each condyle 102, 104, from which movement of the mandible 100 is modeled. In some implementations, the initial condyle pose is positioning of each of the left condyle 102 and the right condyle 104 at a respective origin position. The origin position referred to herein generally refers to a position of the condyles 102, 104 when the mandible is in a state of physiological rest, although this may not always be the case. Each condyle 102, 104 is in their corresponding origin position when the mandible 100 is in a natural rest position, with the mouth of the subject generally closed and the mandible 100 not protruding. In some implementations, the initial condyle pose could be a position of the mandible 100 during imaging by the imaging device 430. Generally, the state of rest or initial condyle pose is the position where the condyles 102, 104 are located on a tubercle of an articular surface of the temporal bone, as will be known in the art. In at least some non-limiting embodiments of the present technology, determining the initial condyle pose of each condyle 102, 104 includes assigning coordinates to a representative point on each condyle 102, 104.

The method 700 then continues, at step 730, with determining a plurality of natural movement parameters for each of the condyles 102, 104. As is mentioned briefly above, embodiments of the present technology use parameters specific to each subject including a maximum protrusion displacement (l), the Bennett angle 114 ($\alpha$), and the Sagittal inclination path angle 110 ($\gamma$) for each of the left and right condyles 102, 104. In some embodiments, determining the natural movement parameters for each condyle 102, 104 includes measuring one or more anatomical structures of the subject from the point cloud representation. In some embodiments, one or more anatomical structures of the subject could be measured by the user and transmitted to the electronic device 540 via the input/output interface 580. Depending on the specific implementation, exact manners of measuring the natural parameters could vary and at least some methods would be known to a person of skill in the art. In some implementations, standardized values could be applied. In some implementations, a dental professional could determine the natural parameters of the subject and submit these values to the electronic device 540 via the input/output interface 580.

Figure 10:
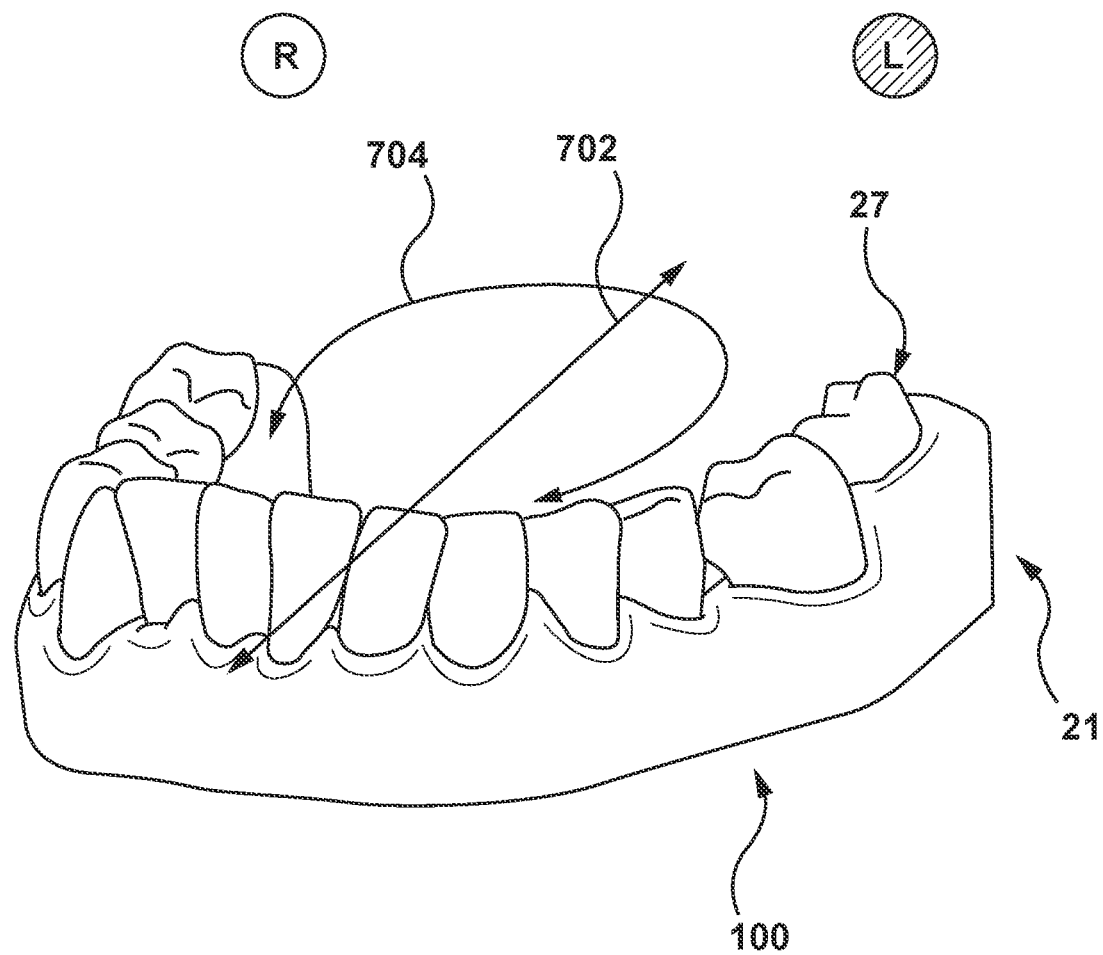
FIG. 10 depicts portions of the lower arch form and mandible of FIG. 1, with translation and rotation displacements illustrated.

The method 700 continues, at step 740, with receiving, from the user via the output/input interface 580 of the electronic device 540, one or more indications of movement to be applied to the mandible point cloud. For each indication, the user inputs a desired movement and magnitude of movement (i.e., distance or angle) to be applied to the point cloud describing the mandible 100. As is illustrated in FIG. 10, the indication can include a translation along an axis 702 (forward or backward motion) and/or a rotation about a center of the mandible 100, represented by arc 704.

While the input received is in the form of generally mutually exclusive motions (rotation, translations, and in some cases hinge movement), the mandible 100 cannot make pure rotation or translation movements due to anatomical constraints, such as the bone and muscular structure of each condyle 102, 104 and the surrounding anatomy.

As such, the method 700 continues, at step 750, with determining a natural movement of the mandible 100 based on receiving the indication of translation, in cases where the user inputs a desired translation. Determining the natural movement corresponding to translation includes determining a protrusion of the mandible 100 followed by a Sagittal inclination of the mandible 100. In order to provide more accurate movement information about the mandible 100, as is mentioned above, the protrusion and inclination are determined based at least in part on the plurality of natural movement parameters.

In some implementations, the method 700 could include determining a constrained translation (t) of the mandible 100 in order to limit movement of the model of the mandible 100 to remain within the natural physical limits of movement of the true mandible 100. The maximum translation (t) of any given movement modeled by the point cloud is limited to either (a) the linear translation of the mandible 100 connecting the initial position of the mandible 100, represented by ($\vec{A}$) and a desired final position of the mandible 100, represented by ($\vec{B}$), or (b) the maximum protrusion displacement (l), previously determined. In at least some implementations, calculating the maximum translation (t) is then determined according to:

$$t = \max\left\{\min\left\{\left(\begin{bmatrix}0\\0\\1\end{bmatrix}\cdot(\vec{B}-\vec{A})\right), 0\right\}, l\right\}.$$

In some implementations, determining the protrusion of the mandible 100 thus includes calculating a displacement of each of the left condyle 102 and the right condyle 104. The left condyle 102 is moved between an initial position, coordinates of which are represented by the vector (L), and a desired final position, coordinates of which are represented by the vector (L') The right condyle 104 is similarly moved between an initial position, represented by the vector (R), and a desired final position, represented by the vector (R'). In some such implementations, calculating the displacement of each condyle 102, 104, in the form of coordinate transformations, in order to determine protrusion by the mandible 100, could then be determined using the relationships:

$$\vec{L}' = \vec{L} + \begin{bmatrix} 0 \\ 0 \\ t \end{bmatrix}, \text{ and}$$

$$\vec{R}' = \vec{R} + \begin{bmatrix} 0 \\ 0 \\ t \end{bmatrix}.$$

Depending on the translation and/or rotation entered by the user, it is contemplated that the initial and final positions of one of the condyles 102, 104 could be identical.

Figure 11:
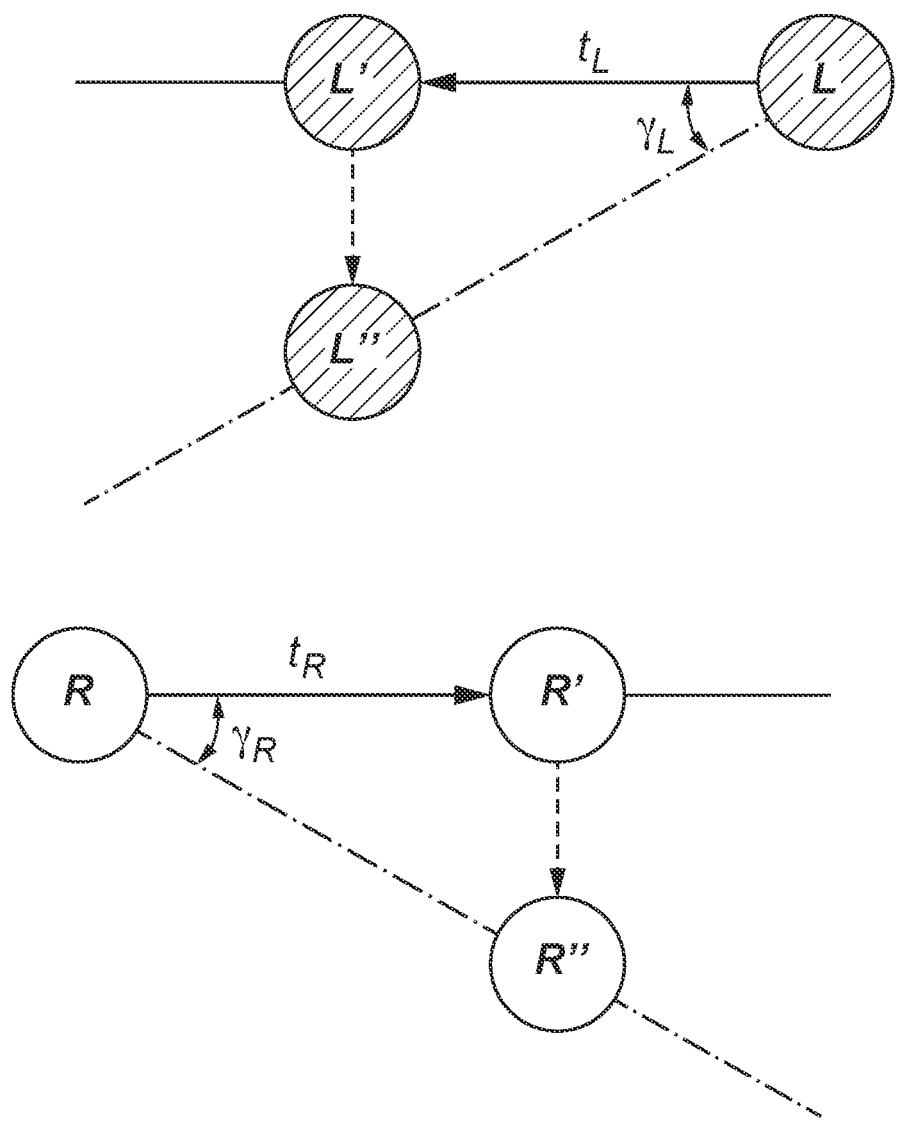
FIG. 11 schematically depicts a coordinate transformation for a Sagittal inclination path movement of the mandible of FIG. 1.

The step 750 of determining the natural movement corresponding to translation then continues, having determined the protrusion corresponding to either the translation entered or limited to the natural maximum protrusion, proceeds with determining the Sagittal inclination of the mandible 100. As is mentioned above, each condyle 102, 104 moves along a Sagittal path angle 110 ($\gamma$) when protruding forward, rather than moving in a fully horizontal motion. As is illustrated in FIG. 11, an angular shift corresponding to movement along the Sagittal inclination path is thus applied to the protruded position (L', R') of each condyle 102, 104 find the final natural position corresponding to the translation entered by the user. In some implementations, the final position coordinates corresponding to the entered translation (L", R") for each condyle 102, 104 can thus be determined from the relations:

$$\vec{L}'' = \vec{S}(\vec{L}, \vec{L}', \gamma_L) = L + (\vec{L}' - \vec{L}) \cdot [0 \tan \gamma_L 0]^T; \text{ and}$$

$$\vec{R}'' = \vec{S}(\vec{R}, \vec{R}', \gamma_R) = \vec{R} + (\vec{R}' - \vec{R}) \cdot [0 \tan \gamma_R 0]^T.$$

The method 700 continues, at step 760, determining a natural movement of the mandible 100 based on receiving the indication when the user has entered a requested rotation ($\theta$) to be applied to the point cloud describing the mandible 100. Determining the natural movement corresponding to the rotation includes determining a Bennett movement of the mandible 100 followed by a Sagittal inclination of the mandible 100, both being similarly determined based at least in part on the natural movement parameters.

In order to limit rotational movement of the mandible 100 to the natural limits of movement, the method 700 includes in some implementations determining a constrained rotation ($\varphi$), similar to the constrained protrusion (t). The constrained rotation ($\varphi$) is based on the distance between the two condyles 102, 104, as well as the protrusion movement available. The protrusion movement available to the mandible 100 is the difference between the maximum protrusion (l) measured above and a translation of the condyles 102, 104 away from their respective origins (such as the translation (t) requested at step 750). In implementations where no translation of the condyles 102, 104 has previously occurred, the constrained rotation ($\varphi$) is limited by the natural parameter of maximum protrusion (l). In at least some non-limiting embodiments, the constrained rotation ($\varphi$) can be determined using the relation:

$$\varphi = \begin{cases} 0, & \theta = 0 \\ \theta \cdot \max\left[\min\left[\text{sgn}(\theta) \cdot \frac{\arcsin\left(\frac{\max(l-t, l)}{\|\vec{R}-\vec{L}\|_2}\right)}{\theta}, 1\right], 0\right], & \theta \neq 0 \end{cases}$$

In cases where the requested rotation ($\theta$) is less than a maximum allowable rotation based on the anatomical limits of the mandible, the constrained rotation ($\varphi$) is simply equal to the requested rotation ($\theta$). In situations where the requested rotation ($\theta$) is greater than the available rotation, the constrained rotation ($\varphi$) is less than the requested rotation ($\theta$) and the rotation applied to the mandible 100 is limited to the constrained rotation ($\varphi$).

Having determined the allowable magnitude of rotation, in the form of the constrained rotation angle ($\varphi$), method 700 continues with determining the Bennett movement based at least on part the indication of the rotation. In some implementations, the Bennett movement is determined by a Bennett movement calculation which includes rotating one of the condyles 102, 104 about the other corresponding condyle 102, 104 and then applying a lateral shift to each condyle 102, 104. With additional reference to FIG. 12, first one condyle 102, 104 is rotated about a center of the other condyle 102, 104 by the angle ($\varphi$). As is illustrated for the left condyle 102, the coordinates of the condyle 102 (L) are rotated to (L') along a rotation arc 706 by the angle ($\varphi$). The exact calculation of coordinate rotation could be done in various manners, and would be apparent to a person of skill in the art.

Figure 12:
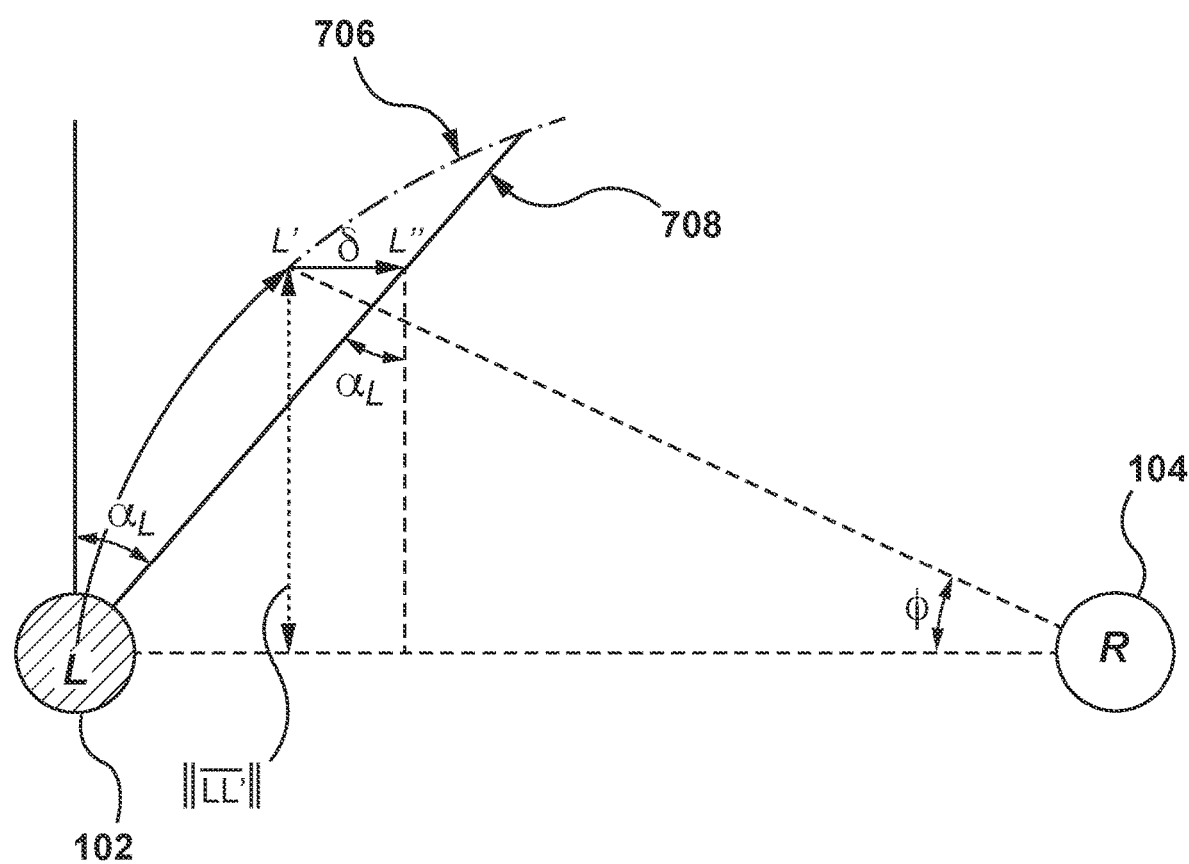
FIG. 12 schematically depicts a coordinate transformation for a Bennett angle movement of the mandible of FIG. 1.

As the condyles 102, 104 do not naturally rotate smoothly about a point but will rather be constrained to moving along at the Bennett angle 114, the rotated condyle coordinate (L') further needs to be shifted onto the Bennett angle line, schematically represented in FIG. 12 as line 708. The shift from the rotated coordinates (A') to a final position (A") on the Bennett line 708 can be described by the following relationship, where the coordinates ($\vec{A}$) represent either the left condyle 102 ($\vec{L}$) or the right condyle 104 ($\vec{R}$):

$$\delta(\vec{A}, \alpha) = \|\vec{AA}'\|_1 \cdot \tan \alpha_A.$$

With the shift ($\delta$) determined, the coordinate transformation to move each condyle 102, 104 for the Bennett movement, using the Bennett angles 114 specific to each condyle 102, 104, can be calculated with the equations:

$$\vec{F}(\vec{A}, \varphi, \alpha) = \begin{cases} \vec{A} + [\delta(\alpha) \ 0 \ 0]^T, & \text{if } \varphi > 0 \\ \vec{A} - [\delta(\alpha) \ 0 \ 0]^T, & \text{if } \varphi < 0 \end{cases}.$$

In the case where ($\varphi > 0$), the left condyle 102 is rotated about the right condyle 104, and the right condyle 104 is rotated about itself. The final coordinates of each condyle 102, 104 can thus be calculated using the equations:

$$\vec{L}' = \vec{F}(\vec{L}', \varphi, \alpha_L); \text{ and}$$

$$\vec{R}'' = \vec{F}(\vec{R}', \varphi, \alpha_L).$$

In the case where ($\varphi<0$), the right condyle 104 is rotated about the left condyle 102, and the left condyle 102 is rotated about itself. The final coordinates of each condyle 102, 104 can thus be calculated using the equations:

$$\vec{L''}=\vec{F}(\vec{L'},\varphi,\alpha_R); \text{ and}$$

$$\vec{R''}=\vec{F}(\vec{R'},\varphi,\alpha_R)$$

Following the determination of the Bennett angle portion of the rotation, a Sagittal inclination of each condyle 102, 104 is then determined according to the method described above.

The method 700 continues, at step 770, applying, by the electronic device 540, the determined one or more natural movements to the point cloud to form a transformed point cloud. In at least some non-limiting implementations, applying the natural movements to the point cloud includes applying the coordinate shifts to the points describing the condyles 102, 104. As the point cloud moves as a rigid body, like the mandible 100, adjustments to the coordinates of the condyles 102, 104 causes a rigid transformation of the entire point cloud describing the mandible 100 and the mandibular arch form 21.

The method 700 continues, at step 780, creating a model of the mandible 100 having undergone the translation and/or the rotation entered by the user using the transformed point cloud. In some cases, creating the model of the mandible 100 having undergone the movement includes rendering the transformed point cloud into a three-dimensional grid image. It is also contemplated that creating the model could include presenting the transformed point cloud in different forms.

The method 700 continues, at step 790, displaying the model of the mandible 100 having undergone the translation and the rotation entered by the use. In some implementations, the model of the mandible 100 having undergone the desired movement is displayed on the interface device 420, at least portions of which being known as an interactive display system 420, generally as implemented as a monitor 420. In some implementations, the model of the mandible 100 could be displayed on a third-party device to which the model could be communicated.

In some implementation, the method 700 could further include determining an orthodontic treatment for the subject based at least in part on the determined transformed point cloud. As one non-limiting example, the model operated in the method 700 could be used to simulating biting, chewing, and/or talking by the subject to verify forces on teeth in one or more intermediate treatment arrangements. It is also contemplated that details of the orthodontic treatment appliance could be modified in view of the model, such as thickness of the aligner 10, for instance. In some treatment plans, for example, the dental professional could determine a change in position of the mandible to be needed in view of tooth adjustments using the present technology. In some treatment plans, the present technology could also be used to determine that additional device elements could be added or adjusted to displacement the mandible, including but not limited to: bite pads and attachments.

In some implementations, the method 700 further includes analyzing one or more orthodontic treatment appliances, such as the aligners 10, for the subject, based at least in part on the transformed point cloud. For example, the present technology could be used in conjunction with a numerical model of the aligner 10, including for instance aligner wall thickness, in order to visualize a three-dimensional model of the mandible 100 with the aligner 10 installed thereon. This would then permit visualization by the dental professional of more natural and realistic movement and interaction of the lower arch form 21 and the aligner 10.

In some implementations, the orthodontic treatment is further determined in response to manipulation of the model of the mandible 100. In some such cases, for example, the user could determine that there may be required steps to adjust pose or alignment of the mandible 100 in order for proper contact to occur between the lower arch form 21 and the upper arch form 20, based on movements of the model of the mandible 100 according to the present technology.

In some implementations, the method 700 could further include manufacturing one or more orthodontic treatment appliances for the subject, such as the aligner 10. In at least some implementations, manufacturing one or more orthodontic treatment appliances for the subject could include sending, by the electronic device 540 or the processor 550, instructions to the manufacturing system 130 to cause the appliances to be manufactured. For example, one or more aligners 10 could be manufactured using the manufacturing system 130, where a design of the orthodontic treatment appliance produced is based at least in part on the determined transformed point cloud.

In some implementations, the method 700 further includes causing displaying, on an interactive display system operatively connected to the electronic device, the transformed point cloud to display the model of the mandible of the subject, In some such cases, the model could be configured to be manipulated by the user or operator of the interactive display system 420.

In some implementations, the method 700 further includes determining hinge movement of the model of the mandible 100. As is mentioned briefly above, hinge movement is defined as rotational movement of the mandible 100 about the line 116 extending through the condyles 102, 104. In some implementations, determining the hinge movement could occur in response to a request or indication from the user. In some other non-limiting implementations, hinge movement could be automatically determined following any indication of movement from the user, in order to model and display open and closed positions of the mandible 100 following requested displacements of the mandible 100.

In some such cases, the hinge movement includes determining the pivot axis 116 extending through the left condyle 102 and the right condyle 104, and then rotating the point cloud of the mandible 100 about the pivot axis 116. In some implementations, the model of the mandible 100 could be directly rotated about the pivot axis 116. The method 700 could then further include displaying the rotated model of the mandible 100 by rotating the transformed point cloud. In order to determine proper placement of the mandible 100 and the lower arch form 21 relative to the upper arch form 20 in a closed position, i.e., such that the teeth 16, 27 do not overlap in the displayed model, different methods for determining the closest possible position between the upper and lower arch forms 20, 21 could be used.

In some implementations, relative placement of the model of the mandible 100 with a model of the maxillary arch form 20 of the subject is determined using iterative bisection of a minimum distance between the model of the mandible 100 and the model of the maxillary arch form 20.

While the method 700 is generally described above are based on receiving either a rotation or a translation, it is contemplated that the user could input both a rotation and a translation to be applied to the mandible 100. In some implementations, modeling movement of the mandible 100 could be performed for a plurality of rotations, a plurality of translations, and/or a mixture of rotations and translations in various orders. In some such implementations for example, the method 700 could further include receiving at least a first indication providing information for a first desired movement and a second indication providing information for a second desired movement. The method 700 would then include determining natural movements for the first and second indications and applying the determined natural movements to the point cloud to form the transformed point cloud.

The method 700 has thus completed modeling movement of the mandible 100. As is described briefly above, an orthodontic treatment plan could include design or selection of one or more aligners 10. In other implementations, additional or alternative treatment appliances or methods could be used in different orthodontic treatment plans.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for modeling mandibular motion, the method executable by an electronic device, the method comprising:
   acquiring a point cloud representing a mandible of a subject;
   determining an initial condyle pose of each of a right condyle of the mandible and a left condyle of the mandible;
   determining a plurality of natural movement parameters for each of the right condyle and the left condyle, the plurality of natural movement parameters including at least:
      a maximum protrusion displacement,
      a Bennett angle, and
      a Sagittal inclination path angle;
   receiving, from a user via an interface of the electronic device, at least one indication of at least one of:
      a translation of the mandible, and
      a rotation of the mandible;
   determining a first natural movement of the mandible based on receiving the at least one indication of the translation, determining the first natural movement including a protrusion of the mandible followed by a first sagittal inclination of the mandible, the first natural movement being determined based at least in part on the plurality of natural movement parameters;
   determining a second natural movement of the mandible based on receiving the at least one indication of the rotation, determining the second natural movement including a Bennet movement of the mandible followed by a second sagittal inclination of the mandible, the second natural movement being determined based at least in part on the plurality of natural movement parameters;
   applying the at least one of the first natural movement and the second natural movement to the point cloud to form a transformed point cloud;
   creating a model of the mandible having undergone the at least one of the translation and the rotation using the transformed point cloud; and
   displaying the model of the mandible having undergone the at least one of the translation and the rotation.

2. The method of claim 1, further comprising:
   determining, an orthodontic treatment for the subject based at least in part on the transformed point cloud.

3. The method of claim 1, further comprising:
   causing displaying, on an interactive display system operatively connected to the electronic device, the transformed point cloud to display the model of the mandible of the subject, the model being configured to be manipulated by an operator of the interactive display system.

4. The method of claim 3, further comprising determining, in response to manipulation of the model, an orthodontic treatment for the patient.

5. The method of claim 1, further comprising determining hinge movement of the model of the mandible of the subject.

6. The method of claim 5, wherein determining the hinge movement comprises:
   determining a pivot axis extending through the left condyle and the right condyle;
   rotating the model of the mandible about the pivot axis; and
   displaying the rotated model of the mandible by rotating the transformed point cloud.

7. The method of claim 6, wherein relative placement of the model of the mandible with a model of a maxilla of the subject is determined using iterative bisection of a minimum distance between the model of the mandible and the model of the maxilla.

8. The method of claim 1, further comprising determining a maximum translation of the mandible.

9. The method of claim 8, wherein determining the maximum translation comprises:
   determining an initial position ($\vec{A}$) of the mandible;
   determining a desired final position ($\vec{B}$) of the mandible; and
   calculating the maximum translation (t) according to:

$$t = \max\left\{\min\left\{\left(\begin{bmatrix}0\\0\\1\end{bmatrix} \cdot (\vec{B} - \vec{A})\right), 0\right\}, l\right\},$$

with (l) being the maximum protrusion displacement.

10. The method of claim 9, wherein:
   determining the protrusion of the mandible comprises calculating a displacement of each of the left condyle and the right condyle; and
   calculating the displacement comprises:

$$\vec{L'} = \vec{L} + \begin{bmatrix}0\\0\\t\end{bmatrix}, \text{ and}$$

$$\vec{R'} = \vec{R} + \begin{bmatrix}0\\0\\t\end{bmatrix},$$

with L being an initial position of the left condyle, R being an initial position of the right condyle, L' being a desired final position of the left condyle, R' being a desired final position of the right condyle.

11. The method of claim 1, wherein:
the Bennett movement is determined based at least on part the at least one indication of the rotation; and
the Bennett movement is determined by a Bennett movement calculation comprising:
    rotating one of the left condyle and the right condyle about an other one of the left condyle and the right condyle, and
    applying a lateral shift to the left condyle and the right condyle.

12. The method of claim 1, wherein:
the at least one indication of the translation is a first indication;
the at least one indication of the rotation is a second indication; and
further comprising:
    receiving the first indication and the second indication,
    determining the first natural movement and the second natural movement, and
    applying the first natural movement and the second natural movement of the point cloud to form the transformed point cloud.

13. The method of claim 1, further comprising manufacturing an orthodontic treatment appliance for the subject, a design of the orthodontic treatment appliance being based at least in part on the determined transformed point cloud.

14. The method of claim 1, further comprising analyzing at least one orthodontic treatment appliance for the subject, based at least in part on the determined transformed point cloud.

15. A system for modeling mandibular motion, the system comprising:
at least one interface device; and
an electronic device including a processor,
    the processor being configured for executing method steps including:
        acquiring a point cloud representing a mandible of a subject;
        determining an initial condyle pose of each of a right condyle of the mandible and a left condyle of the mandible;
        determining a plurality of natural movement parameters for each of the right condyle and the left condyle, the plurality of natural movement parameters including at least:
            a maximum protrusion displacement,
            a Bennett angle, and
            a Sagittal inclination path angle;
        receiving, from a user via an interface of the electronic device, at least one indication of at least one of:
            a translation of the mandible, and
            a rotation of the mandible;
        determining a first natural movement of the mandible based on receiving the at least one indication of the translation, determining the first natural movement including a protrusion of the mandible followed by a first sagittal inclination of the mandible, the first natural movement being determined based at least in part on the plurality of natural movement parameters;
        determining a second natural movement of the mandible based on receiving the at least one indication of the rotation, determining the second natural movement including a Bennet movement of the mandible followed by a second sagittal inclination of the mandible, the second natural movement being determined based at least in part on the plurality of natural movement parameters;
        applying the at least one of the first natural movement and the second natural movement to the point cloud to form a transformed point cloud;
        creating a model of the mandible having undergone the at least one of the translation and the rotation using the transformed point cloud; and
        displaying the model of the mandible having undergone the at least one of the translation and the rotation via the at least one interface device.

* * * * *